(12) United States Patent
Kumamoto et al.

(10) Patent No.: US 6,184,678 B1
(45) Date of Patent: Feb. 6, 2001

(54) ROTOR FOR WHEEL SPEED SENSOR PROVIDING INCREASED DIFFERENCE IN OUTPUT VOLTAGE OF THE SENSOR

(75) Inventors: Yukio Kumamoto, Yokohama; Masayuki Suzuki, Kanagawa; Ikuo Nagami, Yokohama; Masanobu Hayasaka, Kanagawa, all of (JP)

(73) Assignee: Nissan Motor Co., Ltd., Kanagawa (JP)

( * ) Notice: Under 35 U.S.C. 154(b), the term of this patent shall be extended for 0 days.

(21) Appl. No.: 08/891,042

(22) Filed: Jul. 10, 1997

(30) Foreign Application Priority Data

Jul. 10, 1996 (JP) .................................................. 8-180252
Mar. 17, 1997 (JP) .................................................. 9-061612

(51) Int. Cl.[7] ............................. G01P 3/488; G01D 5/245
(52) U.S. Cl. ....................... 324/173; 324/207.25; 310/42; 310/168
(58) Field of Search ..................................... 324/173, 174, 324/207.22, 207.25; 310/42, 168; 384/448; 188/181 R

(56) References Cited

U.S. PATENT DOCUMENTS 4,940,936 * 7/1990 Gaillo et al. ..................... 324/207.25
5,053,656 * 10/1991 Hodge ............................. 324/207.22
5,111,138 * 5/1992 Kramer ............................... 324/174

FOREIGN PATENT DOCUMENTS 6-14058   2/1994   (JP) .
6-37766   5/1994   (JP) .

OTHER PUBLICATIONS

"JIS Handbook Ferrous Materials & Metallurgy I pp. 582–603 1979".

* cited by examiner

Primary Examiner—Walter E. Snow
(74) Attorney, Agent, or Firm—McDermott, Will & Emery

(57) ABSTRACT

A rotor to be used in combination with a wheel speed sensor forming part of an anti-lock brake system. The rotor comprises an annular axial central section formed of a magnetic material. First and second annular axial end sections are coaxial and integral with the central section. The first and second annular axial end sections are formed of the magnetic material and arranged such that the annular axial central section is located between the first and second annular axial end sections. A plurality of holes are formed in the annular axial central section. The holes are arranged at equal intervals in the peripheral direction of the annular axial central section. A plurality of first and second depressions are respectively formed in the first and second axial end sections. A pair of the first and each second depressions are respectively located opposite to each other and connected with each hole.

18 Claims, 7 Drawing Sheets

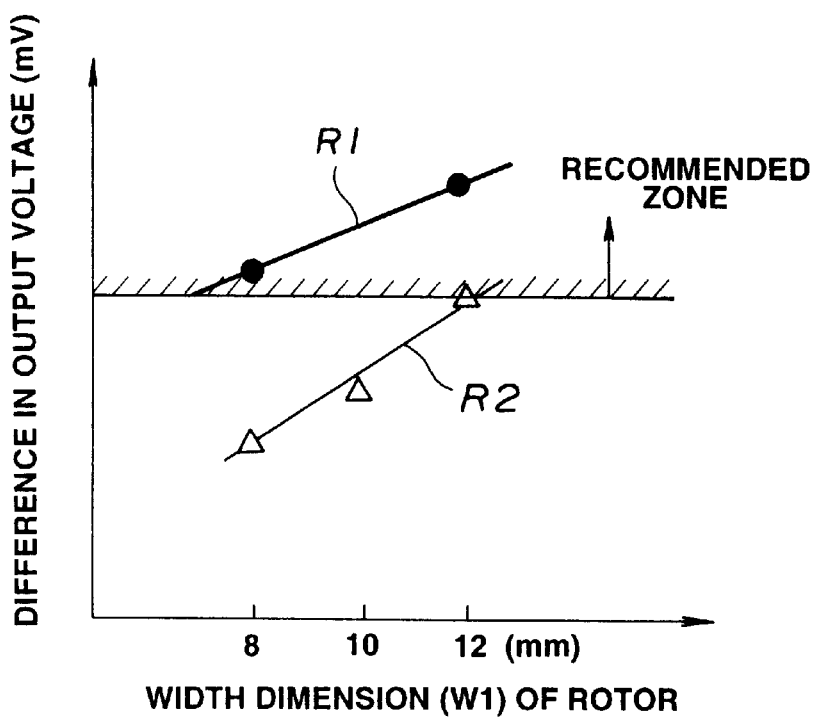
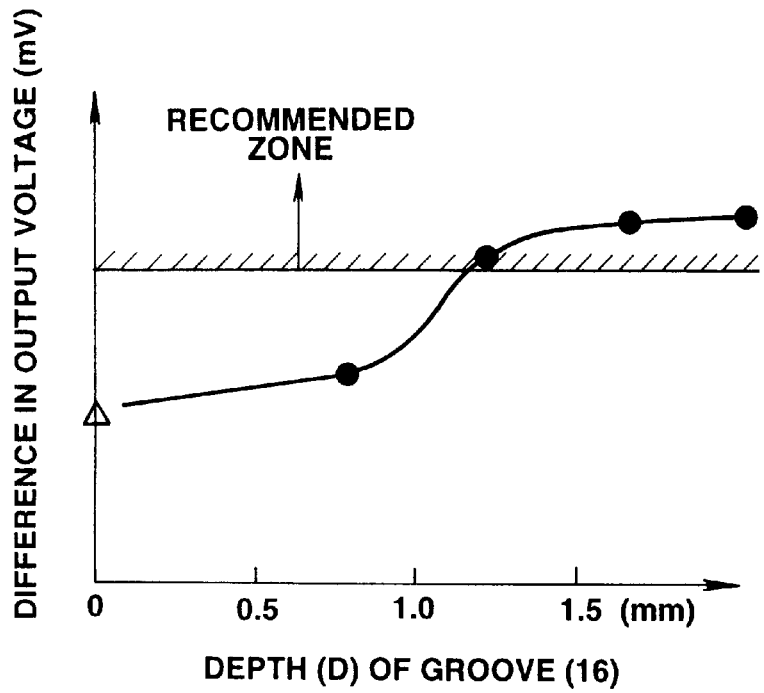

ROTOR FOR WHEEL SPEED SENSOR PROVIDING INCREASED DIFFERENCE IN OUTPUT VOLTAGE OF THE SENSOR

BACKGROUND OF THE INVENTION

1. Field of the Invention

This invention relates to improvements in a rotor to be used in combination with a wheel speed sensor which forms part of an anti-lock brake system or a traction control system for an automotive vehicle, and more particularly to the improvements in the structure of the rotor to raise a detection precision of the rotational speed of a road wheel of an automotive vehicle.

2. Description of the Prior Art

An anti-lock brake system (ABS) for an automotive vehicle includes a wheel speed detecting device for detecting rotational speeds of a road wheel. The wheel speed detecting device includes a ring-shaped rotor which is press-fitted around a hub at the side of an axle shaft on which the road wheel is mounted. A wheel speed sensor is disposed facing the rotor, in which magnetic field is developed around the wheel speed sensor and extends throughout the thickness of the rotor. The rotor is formed with a plurality of holes which are aligned at equal intervals in the peripheral direction thereof, so that the peripheral surface of the rotor is formed uneven to take a generally gear shape,. When the uneven peripheral surface of the rotor traverses the magnetic field from the wheel speed sensor, the magnetic flux density is changed so as to develop an electromotive force at the coil of the wheel speed sensor, thereby causing a change in voltage. This voltage change is output as an wheel speed signal to a ABS control unit for effecting an anti-lock brake to the road wheel.

A variety of shapes of the rotors have been proposed and put into practical use. One of them is formed of a ring-shaped sheet metal strip having a plurality of generally rectangular holes which are formed by being punched out. Another one is formed by cutting gear on the peripheral portion of a ring-shaped member. A further one is disclosed in Japanese Utility Model Provisional Publication No. 6-37766 and has a generally ]-shaped cross-section so as to include inner and outer flange sections each of which is formed with a plurality of holes which are formed by punching out each flange section. A still further one is disclosed in Japanese Patent Publication No. 6-14058 and formed by fitting inner and outer rings to each other in which the outer ring is generally comb-shaped. Of these rotors, one produced by punching out the sheet metal strip to form the generally rectangular holes seems to be the most advantageous form the view points of production cost lowering and weight-lightening.

However, drawbacks have been encountered in such a conventional rotor which is produced by punching out the sheet metal strip to form the generally rectangular holes. That is, it is usual that the width dimension of the rotor is generally equal to or slightly smaller than the width dimension of the sensor head section of the wheel speed sensor since the width dimension of the sensor head is usually restricted in connection with the locational relationship between it and other parts around the wheel speed sensor device. Under such a situation, when each hole of the rotor passes by the sensor head section, flat parts located at the opposite sides of each hole simultaneously pass by the sensor head section. As a result, the difference in magnetic flux density or output voltage in the wheel speed sensor is small between a time when the hole with the flat parts pass by the sensor head section and another time when each axially extending flat section located between the adjacent holes passes by the sensor head section. As a result, precision of detection for rotational speed of the road wheel has been unavoidably suppressed at a relatively low level.

BRIEF SUMMARY OF THE INVENTION

It is an object of the present invention to provide an improved rotor for a wheel speed sensor, which can effectively overcome drawbacks encountered in conventional rotors to be used in combination of a wheel speed sensor.

Another object of the present invention is to provide an improved rotor for a wheel speed sensor, which is high in detection precision of wheel speed as compared with the conventional rotors.

A further object of the present invention is to provide an improved rotor for a wheel speed sensor, by which a difference in magnetic flux density or output voltage becomes large between a time when each hole in the rotor passes by a sensor head section of the wheel speed sensor and a time when a part other than the holes passes by the sensor head section even in case the width dimension of the rotor is restricted relative to the width dimension of the sensor head section, as compared with the conventional rotors.

An aspect of the present invention resides in a rotor to be used in combination with a wheel speed sensor. The rotor comprises an annular axial central section formed of a magnetic material. First and second annular axial end sections are coaxial and integral with the central section. The first and second annular axial end sections are formed of the magnetic material and arranged such that the annular axial central section is located between the first and second annular axial end sections. A plurality of holes are formed in the annular axial central section. The holes are arranged at equal intervals in the peripheral direction of the annular central section. Additionally, first and second depressed surfaces are located radially inward of a radially outward surface of the annular axial central section. The first and second depressed surfaces are respectively formed in the first and second axial end sections and contiguous with each hole.

Another aspect of the present invention resides in a rotor to be used in combination with a wheel speed sensor. The rotor comprises an annular axial central section formed of a magnetic material. First and second annular axial end sections are coaxial and integral with the central section. The first and second annular axial end sections are formed of the magnetic material and arranged such that the annular axial central section is located between the first and second annular axial end sections. A plurality of holes are formed in the annular axial central section. The holes are arranged at equal intervals in the peripheral direction of the annular axial central section. A plurality of first and second depressions are respectively formed in the first and second axial end sections. A pair of the first and second depressions are respectively located opposite to each other and connected with each hole.

According to this aspect, by virtue of the depressions formed in each of the opposite annular axial end sections, the gap between each end section and the sensor head section is large similarly to the gap between each hole and the sensor head section when each hole passes by the sensor head section in case that the width dimension of the rotor is generally equal to or smaller than that of the sensor head section, so that each depression at the end section substantially functions like each hole. As a result, the difference in magnetic flux density or output voltage becomes larger between a time when each hole passes by the sensor head section and a time when a part other than the holes passes by the sensor head section, than that in case of using conventional rotors. This largely improves a detection precision of the wheel speed. As a matter of course, a further larger difference in output voltage can be obtained in case that the width dimension of the rotor is larger than that of the sensor head section.

A further aspect of the present invention resides in a rotor to be used in combination with a wheel speed sensor. The rotor comprises a rotor main body formed of a sheet made of a magnetic material. The rotor main body is arranged as follows: An annular axial central section is projected radially outwardly. First and second annular axial end sections are coaxial and integral with the central section. The first and second annular axial end sections are formed of the magnetic material and arranged such that the annular axial central section is located between the first and second annular axial end sections. Each annular axial end section having a radially outward-most surface which is located radially inward of a radially outward-most surface of the annular axial central section. A plurality of holes are formed in the annular axial central section. The holes are arranged at equal intervals in the peripheral direction of the annular central section. Each hole radially pierces wall of the annular axial central section and axially extends from the first annular axial end section to the second annular axial end section.

According to this aspect, by virtue of the holes formed through the radially outwardly projected or bulged central section, the height difference between the bottom of the hole and the top surface of a part other than the hole is such large as to reach a value corresponding to the total of the height from the top surface of each end section to the top surface of the central section and the thickness of the rotor itself. As a result, the difference in magnetic flux density or output voltage becomes larger between a time when each hole passes by the sensor head section and a time when the part other than the holes passes by the sensor head section, than that in case of using the conventional rotors, thus improving a detection precision of the wheel speed.

BRIEF DESCRIPTION OF THE DRAWINGS

FIG. 4 is a graph showing the relationship between a specified difference in output voltage and the width dimension of the rotor of FIG. 1 in comparison with that of a conventional rotor;

FIG. 5 is a graph showing the relationship between the specified difference in output voltage and the depth of each groove in the rotor of FIG. 1;

DETAILED DESCRIPTION OF INVENTION

Figure 1A:
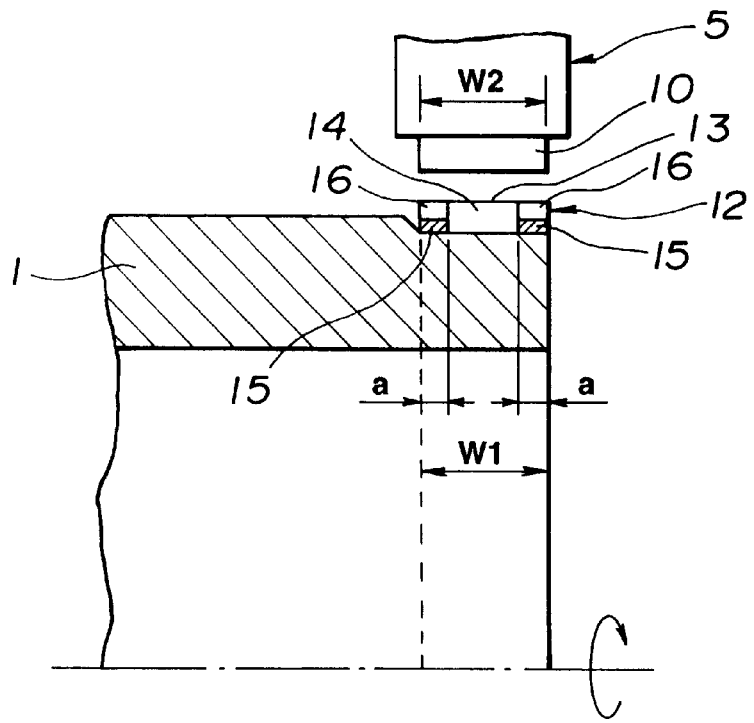
FIG. 1A is a fragmentary schematic sectional view showing the locational relationship between a wheel speed sensor and an embodiment of a rotor according to the present invention.

Referring now to FIGS. 1A, 1B, 2 and 3 of the drawings, an embodiment of a ring-shaped rotor (impulse ring) 12 according to the present invention, is shown to be used in combination of a wheel speed sensor 5. The wheel speed sensor 5 forms part of an anti-lock brake system (ABS) or a traction control system (not shown). An example of the locational relationship between the rotor 12 and the wheel speed sensor 5 is shown in FIG. 1A, in which the rotor 12 is press-fitted on a hub 1 rotatable with an axle shaft 1 on which a road wheel (not shown) is mounted. The rotor 12 is located facing a sensor head section 10 of the wheel speed sensor 5. In this example, the width W1 of the rotor 12 is set to be generally equal to or slightly smaller than the width W2 of the sensor head section 10.

The rotor 12 is formed of a ferromagnetic material such as a stainless steel sheet made of SUS 410 or SUS 430 (according to Japanese Industrial Standard). The rotor 12 comprises an annular axial central section 13 which is formed with a plurality of holes 14 arranged at equal intervals or equal pitch and in the peripheral direction of the central section 13. Each hole 14 is generally rectangular in plan and extends to radially piece the central section 13. In other words, each hole 14 extends from the inner peripheral surface to the outer peripheral surface of the central section 13 as shown in FIG. 1A.

Opposite annular axial end sections 15, 15 are integral with the central section 13 at the axial opposite ends so that the central section 13 is located between the end sections 15, 15. The central section 13 and the end sections 15, 15 constitute the rotor 12 of the one-piece structure. Each end section 15 is formed with a plurality of grooves (depressions) 16 each of which is generally V-shaped in cross-section perpendicular to the axis of the rotor 12. The bottom surface of each groove 16, defining the radially inward-most portion of the groove 16, is rounded to prevent crack from occurring at the bottom surface of the groove 16 even upon concentration of stress. The grooves 16 are formed at the annular outer peripheral surface of each end section 15 and located at equal intervals or an equal pitch, in which each groove 16 of one end section 15 and each groove 16 of the other end section 15 are located at the same position in the peripheral direction of the rotor 12. In other words, each groove 16 of the one end section and each groove 16 of the other end section 15 are located opposite to each other and positioned at the opposite sides of the hole 14. Each groove 16 extends in the axial direction of the rotor 12 so as to reach from the axial outer end surface of the end section 15 to the hole 14, so that each groove 16 is connected or merges with the hole 14. The corresponding grooves 16, 16 and the hole 14 are aligned in the axial direction of the rotor 12. The annular outer peripheral surface of each end section 15 is in flush with the annular outer peripheral surface of the central section 13 as shown in FIG. 1B.

The above rotor 12 is produced as follows: A flat sheet steel strip (material) having a certain width is subjected to press working so as to form a plurality of grooves (16) at equal intervals or equal pitch in the longitudinal direction of the sheet steel strip. Each of the grooves (16) has a V-shaped cross-section and extends in the width direction of the sheet steel strip so as to reach from one side surface to the other side surface of the sheet steel strip. Thereafter, stamping-out is made onto the central section (13) of the sheet steel strip to form a plurality of holes 14 at equal interval or equal pitch to be arranged in the peripheral direction of the sheet steel strip. Each of the holes 14 pieces the sheet steel strip in the thickness direction so that a pair of the grooves 16 ,16 are located at the opposite sides of the hole 14 in the width direction of the sheet steel strip. Finally, roll forming is made on the sheet steel strip to form the sheet steel strip into the ring or annular shape. The opposite longitudinal ends of the thus roll-formed sheet steel strip are brought into contact with each other and welded to be joined, thereby obtaining the ring-shaped rotor 12 as shown in FIG. 1A.

Figure 1B:
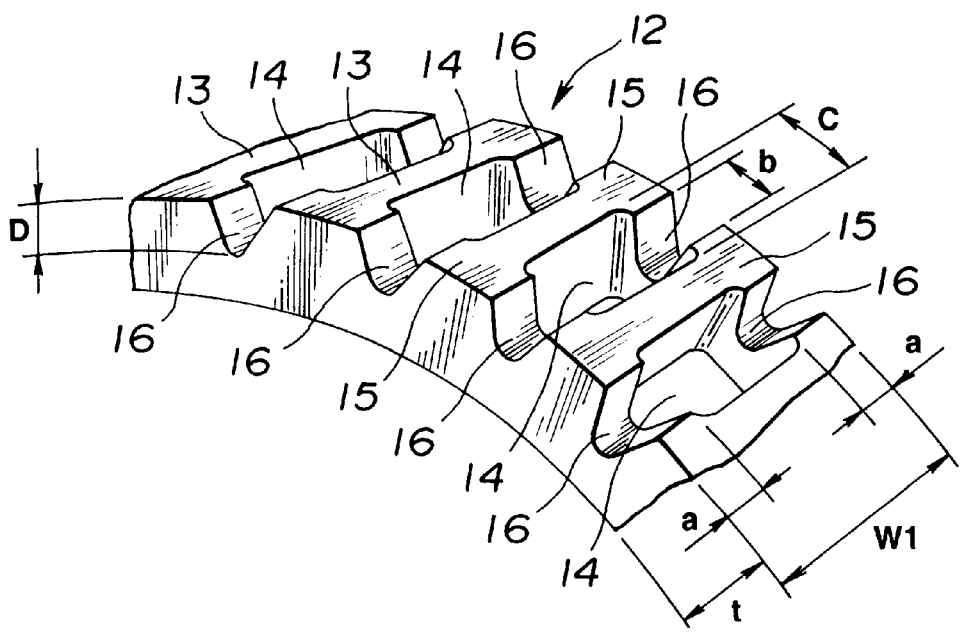
FIG. 1B is a fragmentary perspective view of the rotor of FIG. 1.
Figure 2:
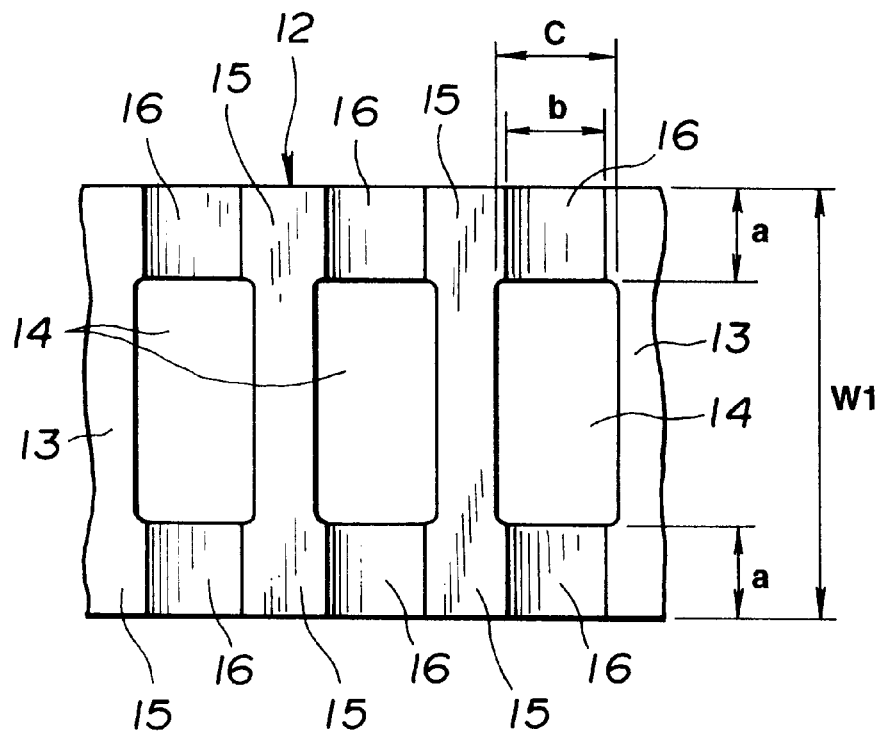
FIG. 2 is a fragmentary plan view of an essential part of the rotor of FIG. 1.

The thus produced rotor 12 is arranged as shown in FIG. 1B, in which the opposite annular axial end sections 15, 15 are formed on the opposite sides of the central section 13 in the axial direction of the ring-shaped rotor 12. The grooves 16 are formed in each annular axial end section 15 in such a manner that each groove 16 opens to the outer peripheral surface of the annular axial end section 15. The peripheral dimension b of each groove 16 at the outer peripheral surface of the annular axial end section 15 is slightly smaller than the dimension c of, each hole 14 at the outer peripheral surface of the annular axial central section 13. During processing in production, as described above, each groove (corresponding to the grooves 16, 16) extending throughout the whole width of the sheet steel strip has been previously formed, and then the stamping-out is made in a manner to punch out the central part of the groove thereby to form the hole 14. In this processing, the above dimensional relationship between the grooves 16 and the hole 14 is advantageous for the reasons set forth below. That is, if the dimensions b and c are equal, each projection (corresponding to each groove 14) of a pierce punch cannot be smoothly brought into engagement with each previously formed groove in the sheet steel strip so as to degrade finishing of the shearing surface serving as the inner peripheral surface defining the hole 14.

The ring-shaped rotor 12 produced as discussed above is press-fitted around the hub 1 on the side of the axle shaft and positioned such that its outer peripheral surface faces the sensor head section 10 of the wheel speed sensor 5 as shown in FIG. 1A, in which the wheel speed sensor 5 senses the rotational condition of the rotor 12 thereby detecting a rotational speed of the road wheel. More specifically, magnetic flux is developed around the vehicle speed sensor 5. This magnetic flux crosses the uneven surface (with the holes 14 and axially extending projecting portions each located between the holes 14) of the rotor 12 which rotates with the road wheel. Density of the magnetic flux changes according to change in gap between the sensor head section 10 and the rotor 12 thereby developing an electromotive force in the coil of the wheel speed sensor 5 so as to cause change in voltage. Such voltage change is output as a signal representing the rotational speed of the road wheel.

The rotor 12 of this embodiment is advantageous even in case that the axial (width) dimension W1 of the rotor 12 is generally equal to or slightly smaller than the width dimension W2 of the sensor head section 10 of the wheel speed sensor 5. That is, simultaneously with passing of each hole 14 by the sensor head section 10, the grooves 16, 16 located at the axially opposite sides of the hole 14 pass by the sensor head section 10. Accordingly, the gap between each axial end section 15 and the sensor head section 10 increases similarly to the gas between the axial central section 13 and the sensor head section 10, so that the grooves 16 at the axial end sections 15 substantially serve as holes and functions the same as the hole 14. As result, when the axially aligned hole 14 and grooves 15, 15 pass by the sensor head, the magnetic flux density abruptly lowers thereby largely lowering the electromotive force as compared with that at a time when the projecting portion of the rotor 12 other than the axially aligned hole 14 and the grooves 15, 15 passes by the sensor head section 10. Thus, difference in output voltage becomes predominant between the time when the axially aligned hole and grooves pass by the sensor head section and the time when the projecting portion of the rotor other than the aligned hole and grooves passes by the sensor head section.

Figure 9:
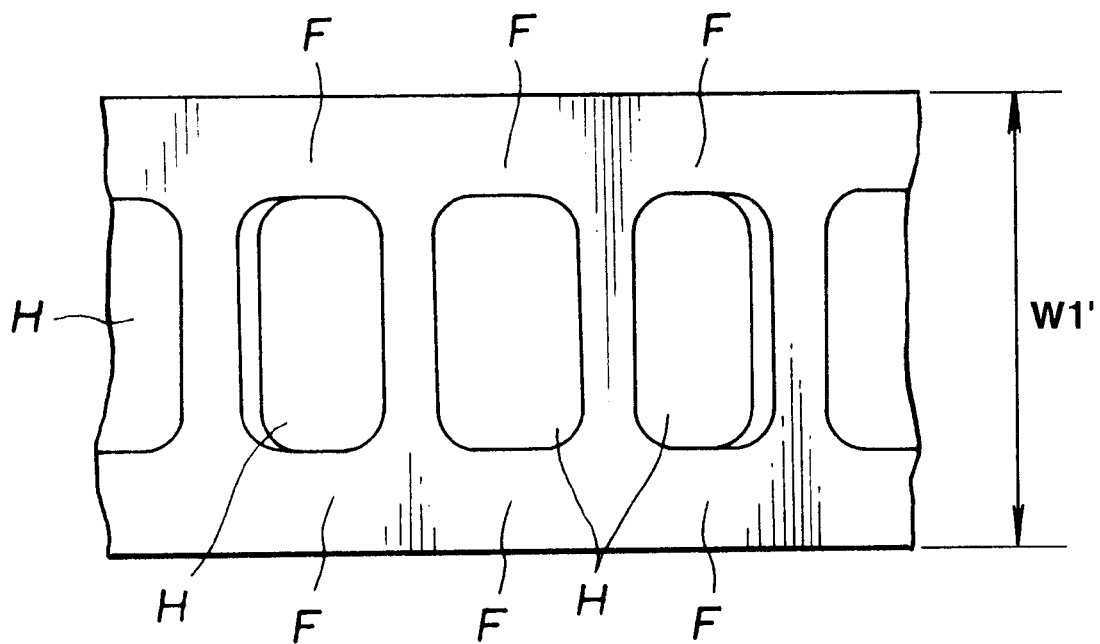
FIG. 9 is a fragmentary plane view of a part of the conventional rotor to be used in combination with a wheel speed sensor.

This difference in output voltage was confirmed by experiments conducted by the inventors of the present application as shown in FIG. 4. The experiments were conducted as follows: The above difference in output voltage was measured for rotors having the structure shown in FIG. 1B and having respectively the width (axial) dimensions of 8 mm, 10 mm and 12 mm. The results of the measurements are indicated by a line R1 in FIG. 4. The line R1 demonstrates that the difference in output voltage sufficiently large to be within a recommended zone. For the comparison purpose, the same measurements were carried out for conventional rotors which have the structure as shown in FIG. 9 and have respectively width (axial) dimensions of 8 mm, 10 mm and 12 mm. The conventional rotor shown in FIG. 9 was formed 30 ring-shaped and formed with only holes H which are aligned in the peripheral direction, each hole H is located at the axially central section of the rotor. The results of the measurements are indicated by a line R2 in FIG. 4. It will be understood that the differences in output voltage were too small to be within the recommended zone. FIG. 4 depicts that the differences in output voltage in the rotors according to the embodiment of the present invention are about 1.5 to 1.6 times the corresponding differences in output voltage in the conventional rotors.

For reference, disadvantages of the conventional rotor constructed as shown in FIG. 9 will be discussed hereinafter. That is, in case that the width dimension (W1') of the conventional rotor shown in FIG. 9 is generally equal to or slightly smaller than the width dimension (W2) of the sensor head section (10) of the wheel speed sensor (5), when each hole H passes by the sensor head section, flat parts F located at the opposite sides of the hole H simultaneously pass by the sensor head section simultaneously with passing of each hole H by the sensor head section. As a result, the difference in magnetic flux density or output voltage in the wheel speed sensor is small between the time when the hole H with the flat parts F passes by the sensor head section and the time when each axially extending flat section A located between the adjacent holes H, H passes by the sensor head section. This will be caused by the fact that the flat parts F also pass by the sensor head section simultaneously with passing-by of the hole H, and therefore passing-by of the flat parts F, F axially aligned with the hole H contribute to development of opposite electromotive force.

While each groove 16 at each annular axial end section 12*b* has been shown and described as being generally V-shaped in section, it will be understood that each groove may be formed into other shapes; however, it is preferable to be formed generally V-shaped in section from the view point of workability. More specifically, each hole 14 of the rectangular shape in plan is formed by making punching-out operation on the wall of the previously formed V-shaped groove which extends throughout the whole width (axial) dimension of the rotor 12, in which engagement of the projection of the pierce punch to the groove 16 is better in case the projection (rectangular in cross-section) of the pierce punch is pressed onto the surface of the groove 16 having the V-shaped cross-section than that in another case the same projection of the pierce punch is pressed onto the surface of the groove having a U-shaped cross-section. Thus, the groove 16 having the generally V-shaped cross-section largely contributes to achieving a high precision working for each hole 14.

Figure 3:
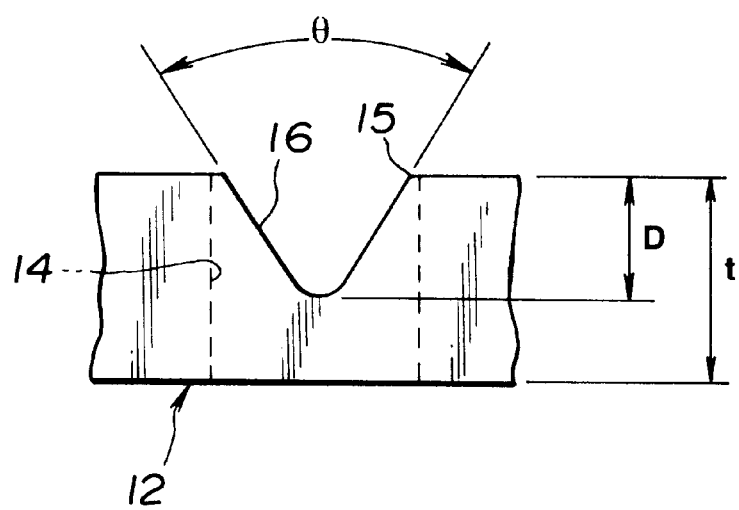
FIG. 3 is a fragmentary side view of an essential part of the rotor of FIG. 1.

Additionally, each groove 16 of the generally V-shape in cross-section has an angle θ defined between the two inclined surfaces thereof, in which the angle θ is within a range of from 50° to 70° as shown in FIG. 3. With the angle in this range, in the press working to form the groove which extends throughout the whole width dimension of the rotor 12, a large depth of the groove can be obtained by only one press working, thereby improving the workability of the rotor 12.

Further, in this embodiment, the depth (or radial dimension) D (in FIG. 1A) of each groove 16 is within a range of from 60% to 75% of the thickness t (in FIG. 1B) of the rotor 12. For example, the depth D is within a range of 1.2 mm to 1.5 mm in case that the thickness t is 2 mm. This range was set according to the results (shown in FIG. 5) of experiments conducted by the inventors of the present application. As apparent from FIG. 5, in case that the depth D of the groove 16 is smaller than 1.2 mm, the difference in output voltage does not become so predominant between the time when the axially aligned hole 14 and grooves 16, 16 pass by the sensor head section and the time when the part of the rotor other than the aligned hole 14 and grooves 16, 16 passes by the sensor head section. Even in case that the depth D exceeds 1.5 mm, the same difference in output voltage cannot so increase while degrading the durability of the rotor 12. It will be understood from FIG. 5, that the above difference in output voltage takes a considerably large value in case that the depth D of the groove 16 is not less than 1.3 mm.

In this embodiment, the width (axial dimension) a of each groove 16 at each annular axial end section 12b is set within a range of from 1 mm to 4 mm for the reasons set forth below. The width a may be the width of the deepest (radially inward-most) portion of the groove 16. That is, if the width a is less than 1 mm, the annular axial end section 15 may collapse or deform during machining of the hole 14. If the width a exceeds 4 mm, the sectional area of the hole 14 is excessively minimized relative to the width (axial dimension) W1 of the rotor 12. It will be understood that the width a corresponds to the thickness (axial dimension) of each annular axial end section 12b. In this connection, it is preferable that the thickness a of each annular axial end section 12b is within a range of from 1.6 mm to 3 mm for the reasons set forth below. The thickness a not less than 1.6 mm securely prevents the axial end sections 12b from collapsing or deforming. The thickness a less than 3 mm makes it possible to weld the opposite ends of the sheet steel strip by using plasma welding when the sheet steel strip is formed ring-shaped to obtain the ring-shaped rotor 12, thus largely improving the productivity of the rotor 12.

As apparent from the above, according to the above-discussed embodiment, merely by adding a slight number of machining steps in the production process of the rotor 12 to form the grooves 16 having the generally V-shaped cross-section in each annular axial end section 12b, the difference in output voltage becomes predominant between the time when the axially aligned hole 14 and grooves 16, 16 pass by the sensor head section and the time when the other part of the rotor than the aligned hole 14 and grooves 16, 16 passes by the sensor head section. This difference in output voltage is considerably large as compared with that in the conventional rotors, thus greatly improving the detection precision of wheel speed.

FIGS. 6 to 8 illustrate another embodiment of the rotor according to the present invention, which is similar to the embodiment of FIGS. 1A to 3. In this embodiment, the rotor 21 comprises a rotor main body 22 which is formed of a stainless steel. The rotor main body 22 includes an annular axial central section 22A. Opposite annular axial end sections 28, 28 are integral with the central section 22A at the axial opposite ends so that the central section 22A is located between the end sections 28, 28. The central section 22A and the end sections 28, 28 constitute the rotor main body 22 of the one-piece structure. The rotor main body 22 has a plurality of embossed portions 23 which are formed at equal intervals or equal pitch and aligned in the peripheral direction of the rotor main body 22. Each embossed portion 23 is generally bridge-shaped and extends in the axial direction of the rotor main body 22 so as to connect the opposite end sections 28, 28. Each embossed portion 23 projects radially outwardly relative to the end sections 22A, 22A. A plurality of holes or spaces 24 are formed at equal intervals or equal pitch and aligned in the peripheral direction of the rotor main body 22 in such a manner that each hole or space 24 is located between the adjacent embossed portions 23, 23. Accordingly, each embossed portion 23 and each hole 24 are alternately located in the peripheral direction of the rotor main body 22. Each hole 24 extends from one end section 28 to the other end section 28.

Specifically, each embossed portion 23 has a flat central wall part 25 whose flat top (radially outward-most) surface has a height h (in FIG. 6B) of not less than 1.2 mm from the top (radially outward-most) surface of each end section 28. The height h is preferably not less than 1.5 mm. Additionally, the height h is set at a value not larger than the thickness (the radial dimension of each side section 28) t of the rotor main body 22. Each embossed portions 23 has opposite end wall parts 27, 27 which are located at the opposite sides of the flat central part 25 and integrally connected to the central wall part 25. Each end wall part 27 is inclined relative to an imaginary vertical plane (not shown) perpendicular to the axis of the rotor main body 22. Each end wall part 27 has a thickness t1 which is within a range of from 60% to 70% of the above thickness t of each end section 28. It will be understood that a space is formed between the adjacent end wall parts 27, 27 as well as between the adjacent central wall parts 25, 25.

As will be understood from the above, although the annular axial end sections 28, 28 exist at the opposite sides of each embossed portion 23 and each hole 24, the end sections 28, 28 are located lower by the dimension h than the top surface of each end section 28 the flat central wall part 25. As a result, even in the case that the width dimension of the rotor main body 22 is generally equal to or slightly smaller than the width dimension of the sensor head section of the wheel speed sensor, each end section 28 never affects the difference in magnetic flux density or output voltage in the wheel speed sensor 5 between a time when each hole 24 passes by the sensor head section 10 and another time when each embossed portion 23 passes by the sensor head section 10. Thus, the difference in output voltage only depends only on the difference in height between the hole 24 and the embossed portion 23, i.e., depends on a change in the gap between the sensor head section 10 and the peripheral surface of the rotor main body 22.

Figure 8A:
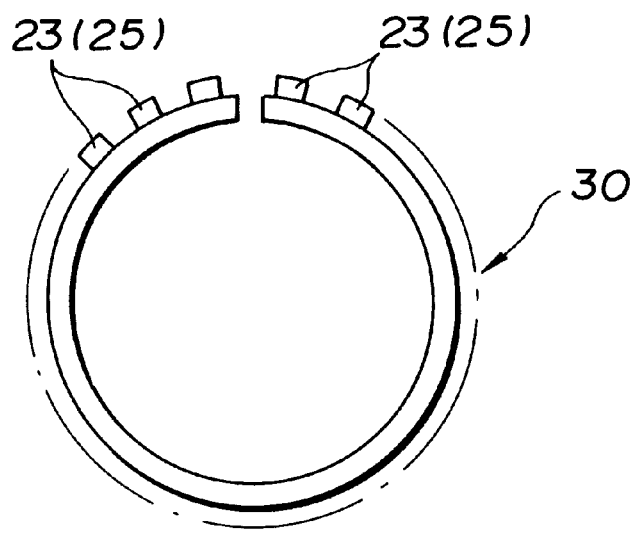
FIGS. 8A to 8C are side views illustrating another part of the process for producing the rotor of FIG. 6A.
Figure 8B:
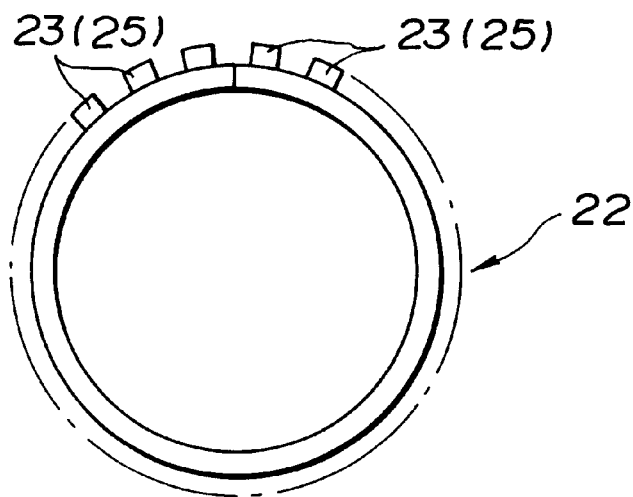
Figure 8C:
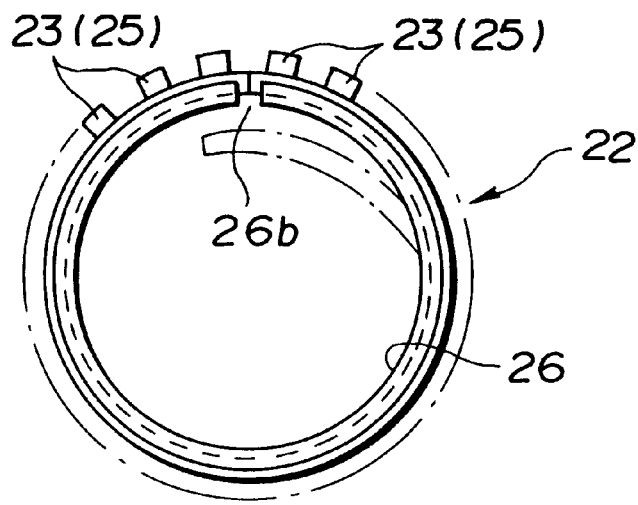

The annular rotor main body 22 is mounted on an inner ring 26 having a generally channel-shaped crosssection. The inner ring 26 includes a flat main body section 26c which is annular and fixedly mounted on the hub 1. The main body section 26c is provided at its axial opposite ends with annular flange sections 26a, 26a which extend radially outwardly. The rotor main body 22 is disposed on the inner ring 26 in such a manner that the annular axial end sections 28, 28 face respectively the opposite flange sections 26a, 26a of the inner ring 26. The inner ring 26 is constructed such that the opposite peripheral ends which face each other are not welded so as to be separate from each other to form a clearance 26b therebetween as shown in FIGS. 8A to 8C. Thus, the inner ring 26 is elastically deformable in a direction to increase or decrease the diameter thereof. It will be understood from the above that the rotor main body 22 is press-fitted through the inner ring 26 on the hub 1.

Production of the above rotor 21 will be exemplified with reference to FIGS. 7A to 7C and FIGS. 8A to 8C.

Figure 7A:
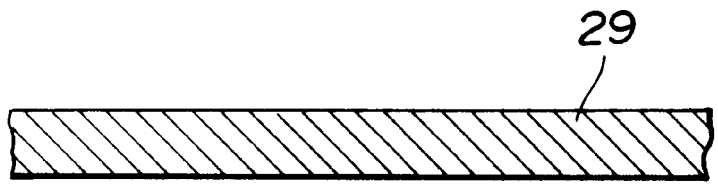
FIGS. 7A to 7D are vertical sectional views illustrating a part of a process for producing the rotor of FIG. 6A.
Figure 7B:
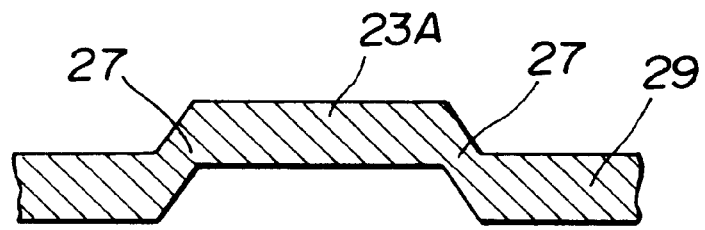
Figure 7C:
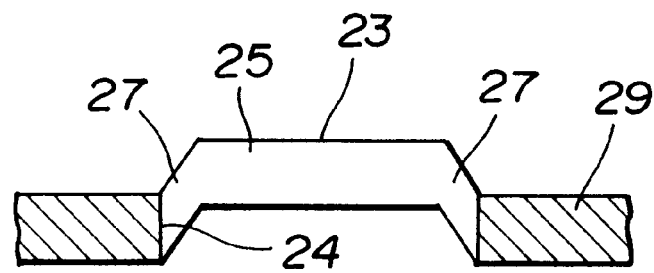
Figure 7D:
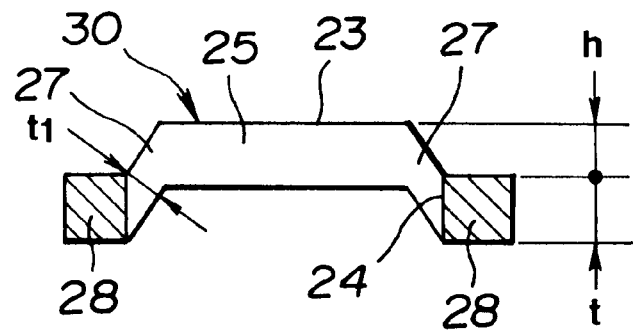

A sheet stainless steel strip (material) 29 having a thickness of 1.5 to 3 mm and a certain width (as shown in FIG. 7A) is subjected to press working to form a linearly extending embossed section 23A, as shown in FIG. 7B in which the embossed section 23A is formed bent upwardly. Then, piercing working is made on the stainless steel strip 29 in a flat state, thereby punching out the stainless steel strip 29 so as to form a plurality of the holes (spaces) 24 at the embossed section 23A at equal intervals or equal pitch, as shown in FIG. 7C. As a result, a plurality of embossed portions 23 are formed aligned at equal intervals or pitch such that each embossed portion 23 is located between the adjacent holes 24, 24. Thereafter, trimming is made on the stainless steel strip 29 to cut out opposite side sections located at the opposite sides of the aligned embossed portions 23 and holes 24, the opposite side sections doing not form part of a product or the rotor main body 22, as shown in FIG. 7D. By this, an intermediate product 30 of the rotor main body 22 is produced in which the sections 28, 28 (in a flat state) are formed. Subsequently, the intermediate product 30 is subjected to roll forming as shown in FIG. 8A to obtain the ring-shaped intermediate product 30, and then the opposite peripheral ends of the ring-shaped intermediate product 30 is brought into contact with each other as shown in FIG. 8B. The contacted opposite peripheral ends of the ring-shaped intermediate product 30 are welded to each other by laser welding, plasma welding or the like, thus obtaining the rotor main body 22.

In the above production process of the rotor main body 22, as shown in FIGS. 7C and 7D, the opposite inclined end wall parts 27, 27 are thinned to decrease the thickness t1 to a value ranging from 0.6t to 0.7t (t: the thickness of the stainless steel strip 29=the thickness of each end section 28) during formation of the embossed section 23A as shown in FIG. 7B, in which work hardening of the inclined end wall parts 27, 27 is expected. This increases the rigidity of each embossed portion 23 against load input from a lateral direction.

The inner ring 26 is produced from a sheet stainless steel strip (material) which is less in thickness than the material of the rotor main body 22 so as to have a thickness of about 0.3 mm. First, the sheet stainless steel strip is subjected to roll forming to be formed into a ring-shape. Then, spinning is made at the axial opposite end sections of the ring-shaped sheet stainless steel strip thereby to form the annular flange sections 26a, 26a. It will be understood that the inner ring 26 is unnecessarily provided with the opposite annular flange sections 26a, 26a, and therefore it is sufficient that the inner ring 26 is provided with at least one of the flange sections 26a, 26a.

Then, the above annular rotor main body section 22 is fitted on the inner ring 26 thus assembling the rotor 21. During this assembling step, one of the peripheral ends defining the clearance 26b is first elastically deformed in the direction to decrease the diameter of the inner ring 26 so as to overlap the other peripheral end as indicated in phantom in FIG. 8C. In other words, the inner ring 26 is elastically deformed so as to decrease the outer diameter thereof to a level smaller than the inner diameter of the rotor main body 22, and then such a state is maintained. The thus deformed inner ring 26 is fitted to the inner peripheral portion of the rotor main body 22, and then the inner ring 26 is released from its restraint force. As a result, the inner ring 26 is restored to its original state under the elastic force of itself, and therefore it is brought into press contact with the inner peripheral section of the rotor main body 22, so that the rotor main body 22 and the inner ring 26 are fitted with each other thus assembling the rotor 21 as shown in FIGS. 6B and 8C.

Figure 6A:
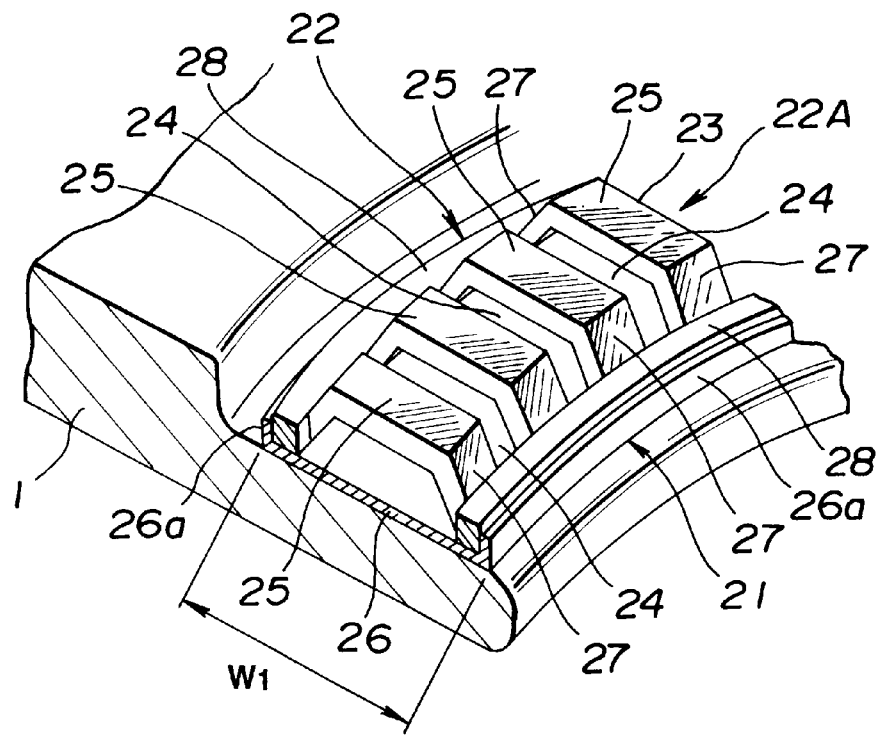
FIG. 6A is a fragmentary perspective view, partly in section, of another embodiment of the rotor according to the present invention.
Figure 6B:
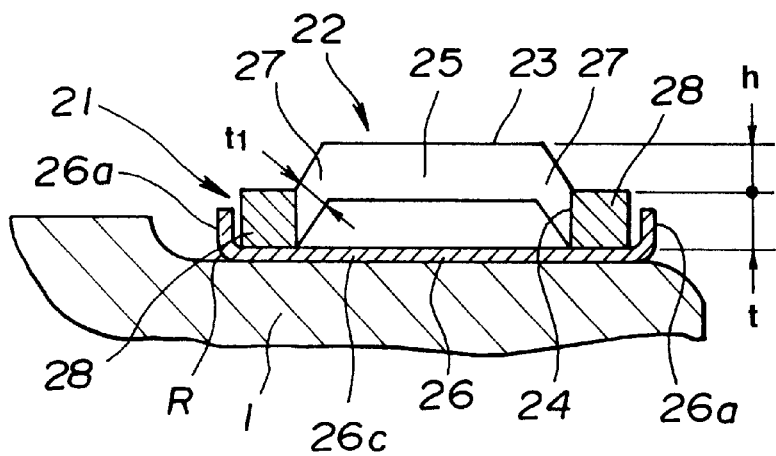
FIG. 6B is a fragmentary vertical sectional view showing the rotor of FIG. 6A.

The thus produced rotor 21 is press-fitted on the hub 1 on the side of the axle shaft as shown in FIG. 6A thereby functioning as a detected object for the wheel speed sensor 5, similarly to the rotor 12 shown in FIGS. 1A to 3. As will be apparent from FIG. 6B, the main body section 26c and the flange section 26a of the inner ring 26 are integrally jointed with each other to form an annular joining portion having an annularly extending surface portion (adjacent the surface of the hub 1) R which is rounded as shown in FIG. 6B. By virtue of the rounded surface portion R, the inner ring 26 can be smoothly press-fitted around the hub 1. By virtue of the fact that the inner ring 26 is interposed between the hub 1 and the rotor main body 22, the rotor main body 22 is prevented from its direct contact with the hub 1, thereby preventing corrosion or rusting from developing from the side of the hub 1 to the side of the rotor main body 22.

In this embodiment, the rotor main body 22 of this embodiment is provided with annular axial end sections 28, 28 located at the opposite sides of each embossed portion 23, in which each end section 28 has the top surface which is located between the top surface of each embossed portion 23 and the bottom level of the hole 24 (or the outer peripheral surface of the main body section 26c of the inner ring 26), so that each end section 28 passes by the sensor head section 10 maintaining a constant distance between the outer peripheral surface of the end section 28 and the sensor head section 10. Accordingly, even in case that the width W1 of the rotor 21 is generally equal to or slightly smaller than the width W2 of the sensor head section 10, the end sections 28, 28 never affects the change in magnetic flux density of the wheel speed sensor 5 between a time when each hole 4 passes by the sensor head section 10 and another time when each embossed portion 23 passes by the sensor head section 10.

In other words, in this embodiment, difference in output voltage between the time when each hole 4 passes by the sensor head section 10 and the time when each embossed portion 23 passes by the sensor head section 10 does not depend on difference in area between the hole 24 and the embossed portion 23 (like in the embodiment of FIGS. 1A to 3) and depends only on difference in height (radial dimension) between the bottom level of each hole 24 (the outer peripheral surface of the inner ring main body section 26c) and the level of the top surface of each embossed portion 23. This difference in height corresponds to the total of the thickness t of each end section 28 and the height h of each embossed portion 23 from the top surface of the end section 28.

Accordingly, in this embodiment, existence and non-existence of the hole 24 in the rotor 21 provides the height difference (corresponding to the sum of the dimensions h and t) which is larger than the thickness t of the rotor main body 22. As a result, the existence and non-existence of the hole 24 can make a predominant difference in magnetic flux density or output voltage, while the thickness t of the rotor main body 22 required to obtain the same output voltage can be relatively reduced thereby improving productivity of and lowering production cost of the rotor 21.

It will be understood that the structure of the rotor 21 of this embodiment is produced mainly by making bending for forming the embossed portions 23 and stamping for forming the holes 24 without using a troublesome working such as cold forging. Accordingly, the rotor 21 of this embodiment can be produced by using a simple press machine.

While each embossed portion 23 has been formed generally trapezoid-shaped in cross-section parallel with a first imaginary radial plane parallel with the axis of the rotor 21 so that each end wall part 27 of the embossed portion 23 is inclined relative to a second imaginary radial plane perpendicular to the axis of the rotor 21, it will be appreciated that the embossed portion 23 may be formed generally rectangle-shaped in cross-section parallel with the first imaginary radial plane so that the end wall part 27 is parallel with the second imaginary radial plane. However, it is preferable that each embossed portion 23 takes the structure shown in FIGS. 6A and 6B from the view point of obtaining the rigidity against load input from the lateral direction of the embossed portion 23.

What is claimed is:

1. A rotor to be used in combination with a wheel speed sensor, comprising:
    an annular axial central section formed of a magnetic material and having a plurality of holes which are arranged at equal intervals in the peripheral direction of said annular central section; and
    first and second annular axial end sections which are coaxial and integral with said central section, said first and second annular axial end sections being formed of the magnetic material and arranged such that said annular axial central section is located between said first and second annular axial end sections, said first and second annular axial end sections having respectively first and second depressed surfaces which are located radially inward of a radially outward surface of said annular axial central section and contiguous with each hole.

2. A rotor to be used in combination with a wheel speed sensor, comprising:
    an annular axial central section formed of a magnetic material and having a plurality of holes formed in said annular axial central section which are arranged at equal intervals in the peripheral direction of said annular axial central section; and
    first and second annular axial end sections which are coaxial and integral with said central section, said first and second annular axial end sections being formed of the magnetic material and arranged such that said annular axial central section is located between said first and second annular axial end sections, said first and second annular axial end sections having respectively a plurality of first depressions and a plurality of second depressions, each first and each second depression being respectively formed in said first and second axial end sections, a pair of the first and each second depressions being respectively located opposite to each other and connected with each hole.

3. A rotor as claimed in claim 2, wherein each hole in said annular axial central section is generally rectangular in plane.

4. A rotor as claimed in claim 3, wherein each first depression, each hole and each second depression are aligned with each other to extend in an axial direction of said rotor.

5. A rotor as claimed in claim 2, wherein each of said first and second depressions is a groove formed to extend throughout the whole thickness of each of said first and second annular axial end sections in an axial direction of said rotor.

6. A rotor as claimed in claim 2, wherein an axial dimension between the axial end surfaces of said first and second annular axial end sections is not larger than a width of a sensor head section of said wheel speed sensor, said width being in a direction parallel with the axial dimension.

7. A rotor as claimed in claim 3, wherein said groove is generally V-shaped in cross-section perpendicular to axis of said rotor, said groove having a radially inward-most portion which axially extends, said radially inward-most portion being defined by an axially extending surface which is rounded in section perpendicular to the axis of said rotor.

8. A rotor as claimed in claim 7, wherein said groove has an radial dimension of not less than 1.2 mm and of not larger than 75% of a radial dimension of each of said first and second annular axial end sections.

9. A rotor as claimed in claim 8, wherein an axial dimension of said radially inward-most portion of said groove is within a range of from 1 mm to 4 mm.

10. A rotor to be used in combination with a wheel speed sensor, comprising:
    a rotor main body formed of a sheet of magnetic material, including an annular axial central section which projects radially outwardly and has a plurality of discrete holes which are arranged at equal intervals in the peripheral direction of said annular central section so that a generally bridge-shaped portion is defined between adjacent two of said holes, the generally bridge-shaped portion and each hole being alternatively located in the peripheral direction of said annular central section, each hole radially piercing wall of said annular axial central section; and
    first and second annular axial end sections which are coaxial and integral with said central section, said first and second annular axial end sections being formed of the magnetic material and arranged such that said annular axial central section is located between said first and second annular axial end sections, each annular axial end section having a radially outward-most surface which is located radially inward of a radially outward-most surface of said annular axial central section, each hole in said annular axial central section extending from said first annular axial end section to said second annular axial end section.

11. A rotor as claimed in claim 10, wherein said annular axial central section is formed by embossing said sheet.

12. A rotor as claimed in claim 10, wherein each hole is generally rectangular in plan.

13. A rotor to be used in combination with a wheel speed sensor, comprising:

a rotor main body formed of a sheet made of a magnetic material, including an annular axial central section which is projected radially outwardly and has a plurality of holes which are arranged at equal intervals in the peripheral direction of said annular central section, each hole radially piercing wall of said annular axial central section; and first and second annular axial end sections which are coaxial and integral with said central section, said first and second annular axial end sections being formed of the magnetic material and arranged such that said annular axial central section is located between said first and second annular axial end sections, each annular axial end section having a radially outward-most surface which is located radially inward of a radially outward-most surface of said annular axial central section, each hole in said annular axial central section extending from said first annular axial end section to said second annular axial end section, wherein said annular axial end section includes a plurality of generally bridge-shaped embossed portions which are arranged at equal intervals in the peripheral direction of said annular axial central section, each embossed portion having a central wall part which is located radially outward of each axial end section, and first and second end wall parts which are respectively integral with opposite ends of said central wall part and integral respectively with said first and second end sections.

14. A rotor to be used in combination with a wheel speed sensor, comprising:

a rotor main body formed of a sheet made of a magnetic material, including an annular axial central section which is projected radially outwardly and has a plurality of holes which are arranged at equal intervals in the peripheral direction of said annular central section, each hole radially piercing wall of said annular axial central section; and first and second annular axial end sections which are coaxial and integral with said central section, said first and second annular axial end sections being formed of the magnetic material and arranged such that said annular axial central section is located between said first and second annular axial end sections, each annular axial end section having a radially outward-most surface which is located radially inward of a radially outward-most surface of said annular axial central section, each hole in said annular axial central section extending from said first annular axial end section to said second annular axial end section, wherein said annular axial end section includes a plurality of generally bridge-shaped embossed portions which are arranged at equal intervals in the peripheral direction of said annular axial central section, each embossed portion having a first radially outward-most surface, and each end section having a second radially outward-most surface, a difference in radial dimension between said first radially outward-most surface and said second radially outward-most surface is not less than 1.2 mm and not more than a thickness of said sheet.

15. A rotor as claimed in claim 13, wherein each of said first and second end wall parts is inclined relative to a plane perpendicular to axis of said rotor, and has a thickness from 60 to 70% of each end section.

16. A rotor to be used in combination with a wheel speed sensor, comprising:

a rotor main body formed of a sheet made of a magnetic material, including an annular axial central section which is projected radially outwardly and has a plurality of holes which are arranged at equal intervals in the peripheral direction of said annular central section, each hole radially piercing wall of said annular axial central section;

first and second annular axial end sections which are coaxial and integral with said central section, said first and second annular axial end sections being formed of the magnetic material and arranged such that said annular axial central section is located between said first and second annular axial end sections, each annular axial end section having a radially outward-most surface which is located radially inward of a radially outward-most surface of said annular axial central section, each hole in said annular axial central section extending from said first annular axial end section to said second annular axial end section; and an inner ring which is disposed radially inward of said rotor main body and includes a cylindrical main body section on which said rotor main body is mounted, and an annular flange section which is formed at at least one axial end of said main body section, said annular flange section extending radially outwardly so as to be located adjacent to one of said end sections.

17. A rotor for use with a wheel speed sensor, comprising:

a rotor main body formed of a sheet made of a magnetic material, including an annular axial central section which projects radially outwardly and has a plurality of holes which are arranged at equal intervals in the peripheral direction of said annular central section, each hole radially piercing wall of said annular axial central section, said annular axial central section including a plurality of generally bridge-shaped portions each of which is radially outwardly projected and formed between adjacent two of said holes, each generally bridge-shaped portion and each hole being located alternate in the peripheral direction of said annular central section, said wheel speed sensor being disposed facing said annular axial central section, and first and second annular axial end sections which are coaxial and integral with said central section, said first and second annular axial end sections being formed of the magnetic material and arranged such that said annular axial central section is located between said first and second annular axial end sections, said first and second annular axial end sections having respectively first and second depressed surfaces which are located radically inward of a radially outward surface of said annular axial central section and contiguous with each other.

18. A rotor as claimed in claim 10, wherein each generally bridge-shaped portion is located radially inward of and faceable with the wheel speed sensor so that each generally bridge and each hole are alternately exposed to the wheel speed sensor to change density of magnetic flux from the wheel speed sensor.

* * * * *